US012567342B2

(12) United States Patent
Bates

(10) Patent No.: US 12,567,342 B2
(45) Date of Patent: Mar. 3, 2026

(54) FLUID SIMULATION APPARATUS

(71) Applicant: LIMBS & THINGS LTD, Bristol (GB)

(72) Inventor: Myles Bates, Bristol (GB)

(73) Assignee: LIMBS & THINGS LTD, Bristol (GB)

( * ) Notice: Subject to any disclaimer, the term of this patent is extended or adjusted under 35 U.S.C. 154(b) by 732 days.

(21) Appl. No.: 17/758,615

(22) PCT Filed: Oct. 30, 2020

(86) PCT No.: PCT/EP2020/080571
§ 371 (c)(1),
(2) Date: Jul. 11, 2022

(87) PCT Pub. No.: WO2021/144047
PCT Pub. Date: Jul. 22, 2021

(65) Prior Publication Data
US 2023/0035936 A1 Feb. 2, 2023

(30) Foreign Application Priority Data

Jan. 16, 2020 (GB) ...................................... 2000646

(51) Int. Cl.
*G09B 23/30* (2006.01)
*G09B 23/28* (2006.01)
(52) U.S. Cl.
CPC ......... *G09B 23/303* (2013.01); *G09B 23/281* (2013.01)
(58) Field of Classification Search
CPC ....... G09B 23/30; G09B 23/303; G09B 25/00
USPC ......................................... 434/365–367, 370
See application file for complete search history.

(56) References Cited

U.S. PATENT DOCUMENTS

| | | | | |
|---|---|---|---|---|
| 6,085,579 A | * | 7/2000 | Herrlein | A61F 13/84 604/378 |
| 6,298,714 B1 | * | 10/2001 | Courtray | B30B 9/22 73/73 |
| 6,446,495 B1 | * | 9/2002 | Herrlein | A61F 13/15203 73/866 |

(Continued)

FOREIGN PATENT DOCUMENTS

| | | |
|---|---|---|
| EP | 3399515 A1 | 11/2018 |
| WO | 2016162415 A1 | 10/2016 |
| WO | 2018126169 A1 | 7/2018 |

OTHER PUBLICATIONS

Search Report and 1st Written Opinion International Searching Authority, Application No. PCT/EP2020/080571, dated Feb. 16, 2021. ISA/European Patent Office.

(Continued)

*Primary Examiner* — Kurt Fernstrom
(74) *Attorney, Agent, or Firm* — Honigman, LLP; John Chau

(57) ABSTRACT

A fluid simulation apparatus comprises: a simulation pad having an internal reservoir, the simulation pad comprising at least one transparent outer surface through which a portion of the internal reservoir is visible; a source configured to contain a bodily fluid analogue; and a conduit fluidly connecting the source to the internal reservoir of the simulation pad; wherein the fluid simulation apparatus is controllable to cause bodily fluid analogue within the source to be delivered through the conduit to the simulation pad.

17 Claims, 8 Drawing Sheets

(56)                References Cited

U.S. PATENT DOCUMENTS

| | | | | |
|---|---|---|---|---|
| 6,557,398 | B2 * | 5/2003 | Lindmark | G01N 15/0893 |
| | | | | 73/159 |
| 7,174,774 | B2 * | 2/2007 | Pawar | A61F 13/42 |
| | | | | 434/365 |
| 7,566,222 | B2 * | 7/2009 | Harkin | G09B 25/00 |
| | | | | 434/262 |
| 7,731,085 | B2 * | 6/2010 | Gillespie | A47F 7/286 |
| | | | | 221/92 |
| 7,949,163 | B2 * | 5/2011 | Honkonen | A61F 13/15203 |
| | | | | 382/128 |
| 8,137,290 | B2 * | 3/2012 | Zhang | A61B 5/4294 |
| | | | | 434/428 |
| 8,192,205 | B2 * | 6/2012 | Weaver | G09B 19/0076 |
| | | | | 434/367 |
| 8,939,772 | B2 * | 1/2015 | Agami | G09B 23/28 |
| | | | | 434/365 |
| 2002/0120410 | A1 * | 8/2002 | Pourdeyhimi | G01N 33/367 |
| | | | | 702/30 |
| 2007/0048709 | A1 * | 3/2007 | Ales, III | G09B 19/00 |
| | | | | 434/262 |
| 2009/0311661 | A1 * | 12/2009 | Weaver | G06Q 30/02 |
| | | | | 434/367 |
| 2013/0309643 | A1 | 11/2013 | Segall | |
| 2016/0165880 | A1 | 6/2016 | Tsukiyama et al. | |
| 2016/0262961 | A1 * | 9/2016 | Mercadante | A61F 13/84 |
| 2018/0190155 | A1 | 7/2018 | Segall | |
| 2018/0263433 | A1 | 9/2018 | Osborne, Jr. | |
| 2019/0066539 | A1 | 2/2019 | Hendrickson et al. | |

OTHER PUBLICATIONS

2nd Written Opinion of the International Preliminary Examining Authority, Application No. PCT/EP2020/080571, dated Jan. 5, 2022. ISA/European Patent Office.

Written Opinion of the International Preliminary Examining Authority, Application No. PCT/EP2020/080571, dated Apr. 8, 2022.

UK Search Report, Application No. GB2000646.6, dated Jul. 13, 2021.

* cited by examiner

FLUID SIMULATION APPARATUS

CROSS-REFERENCE TO RELATED APPLICATIONS

This application is the U.S. national stage of PCT/EP2020/080571 filed on Oct. 30, 2020, which claims priority of Great Britain Application No. GB 2000646.6 filed on Jan. 16, 2020, the contents of which are incorporated herein.

TECHNICAL FIELD

The present disclosure relates to a bodily fluid simulation apparatus, a fluid simulation system and a method of simulating a discharge of a bodily fluid.

BACKGROUND

In the training of medical personnel various medical procedures may be practised or simulated on manikins, simulated patients or standardised patients. The similarity between the practice procedures and real procedures can be increased through the provision of simulated bodily fluid, referred to herein as a bodily fluid analogue.

Typically bodily fluid analogue is provided by either pouring the bodily fluid analogue onto a manikin or into the medical training environment. For example, a bodily fluid analogue for blood may be loaded into a storage space within a manikin, and caused to be discharged through an orifice in the manikin to simulate bleeding.

These methods have the drawback that the bodily fluid analogue flows freely over the manikin or the medical training environment. This increases the amount of time needed to clean up the manikin/medical training environment for re-use compared to practice procedures in which a bodily fluid analogue is not provided. This, in turn, limits the number of practice procedures that can be performed with a given manikin/medical training environment in a given time period.

Additionally, some manikins include electronics which may be damaged if they come into contact with a fluid. If a bodily fluid analogue is used with such a manikin it is necessary to protect the electronics (e.g. by providing a waterproof cover for the electronics, or by providing fluid-absorbing material around the electronics).

The present disclosure attempts to address some of the drawbacks associated with prior art fluid simulation methods and apparatuses.

SUMMARY

According to a first aspect there is provided a fluid simulation apparatus comprising: a simulation pad having an internal reservoir, the simulation pad comprising at least one transparent outer surface through which a portion of the internal reservoir is visible; a source configured to contain a bodily fluid analogue; and a conduit fluidly connecting the source to the internal reservoir of the simulation pad; wherein the fluid simulation apparatus is controllable to cause bodily fluid analogue within the source to be delivered through the conduit to the simulation pad.

Optionally, the fluid simulation apparatus comprises a valve configured to control a rate of fluid flow between the source and the simulation pad.

Optionally, the source of bodily fluid analogue comprises a container configured to contain the bodily fluid analogue above the level of the simulation pad, and a valve, wherein the valve is configured to control a rate of fluid flow between the source and the simulation pad.

Optionally, the source of simulated bodily fluid comprises a container configured to contain the bodily fluid analogue, and a pump, wherein the pump is operable control a variable rate of fluid flow between the source and the simulation pad.

Optionally, the container is configured to contain the bodily fluid analogue below the simulation pad.

Optionally, the fluid simulation apparatus further comprises a controller operably coupled to valve and/or pump and configured to vary a rate of fluid flow between the source and the simulation pad.

The controller may comprise a user interface operable by a user to set the rate of fluid flow.

Optionally, the controller is operable to vary a rate of fluid flow between the source of bodily fluid analogue and the simulation pad according to one or more pre-set fluid delivery profiles.

At least one of the pre-set fluid delivery profiles may be configured to deliver the bodily fluid analogue for a limited predetermined duration at a plurality of different fluid flow rates within the predetermined duration.

Optionally, the simulation pad comprises a waterproof base and a cover sealed to the base at a periphery of the cover wherein the internal reservoir is formed between the cover and the base, and wherein the cover comprises the transparent outer surface.

Optionally, a fluid absorbent material is disposed in the internal reservoir of the simulation pad.

Optionally, the fluid absorbent material is removable and/or replaceable from the internal reservoir. Optionally, the fluid absorbent material is reusable.

Optionally, the internal reservoir is openable and closeable to permit removal and/or replacement of the fluid absorbent material and bodily fluid analogue received therein.

Optionally, the source is integral with the simulation pad.

Optionally, the bodily fluid analogue is one of: venous blood analogue, arterial blood analogue, urine analogue, feces analogue, amniotic fluid analogue, and birthing meconium analogue.

Optionally, the source is charged with the bodily fluid analogue for delivery to the simulation pad.

According to a second aspect there is provided fluid simulation system comprising a fluid simulation apparatus according to the first aspect and a manikin, wherein the manikin is disposed on or adjacent the simulation pad, and wherein the source is optionally provided within the manikin.

According to a third aspect there is provided method of simulating a discharge of bodily fluid using a fluid simulation apparatus in accordance with any one of the preceding claims, the method comprising: controlling a rate at which bodily fluid analogue is delivered from the source to the simulation pad.

Optionally, the method further comprises: prior to bodily fluid being delivered to the simulation pad, evacuating the simulation pad of gas, for example by vacuum sealing the simulation pad.

Where the method is performed using a fluid simulation apparatus wherein the internal reservoir is openable and closeable to permit removal of the fluid absorbent material and bodily fluid analogue received therein, the method may optionally comprise: opening the internal reservoir; removing the fluid absorbent material; removing the bodily fluid analogue to clean the internal reservoir; inserting a fluid absorbent material within the internal reservoir; closing the internal reservoir, optionally wherein the internal reservoir is closed by vacuum sealing.

Where the method is performed using a fluid simulation apparatus wherein the source of bodily fluid analogue comprises a container configured to contain the bodily fluid analogue above the level of the simulation pad, and a valve, wherein the valve is configured to control a rate of fluid flow between the source and the simulation pad, the method may optionally comprise: arranging the fluid simulation apparatus so that the container is disposed above the level of the simulation pad so that the bodily fluid analogue is biased to flow towards the simulation pad.

Where the method is performed using a fluid simulation apparatus wherein the source of simulated bodily fluid comprises a container configured to contain the bodily fluid analogue, and a pump, wherein the pump is operable control a variable rate of fluid flow between the source and the simulation pad, the method may optionally comprise: arranging the fluid simulation apparatus so that the container is below the level of the simulation pad.

According to a fourth aspect there is provided fluid simulation apparatus comprising: a length of sheet material having the appearance of a discharge of bodily fluid on a surface; and a motor unit configured to operate a dispensing mechanism to feed out the sheet material from a retracted configuration.

The dispensing mechanism may comprise a roll of the sheet material which is fed out by the motor unit rotating the roll.

Optionally, a controller is connected to the motor unit to control a rate of feeding out the sheet material.

Optionally, the controller comprises a user interface operable by a user to set the rate of feeding out the sheet material, optionally wherein the controller is operable to vary the rate of feeding out the sheet material according to one or more pre-set sheet feeding profiles.

At least one of the pre-set sheet feeding profiles may be configured to feed out the sheet material for a limited predetermined duration at a plurality of different rates of feeding out the sheet material within the predetermined duration.

Optionally, the sheet material comprises a fluid simulation pattern formed by at least one of: paint, ink, a colored translucent layer, a foam, a fluid captive between layers of the sheet material, and a gel captive between layers of the sheet material.

BRIEF DESCRIPTION OF THE DRAWINGS

Embodiments will now be described by way of example only, with reference to the Figures, in which.

DETAILED DESCRIPTION OF PREFERRED EMBODIMENTS

Aspects and embodiments of the present disclosure will now be discussed with reference to the accompanying figures. Further aspects and embodiments will be apparent to those skilled in the art.

Figure 1:
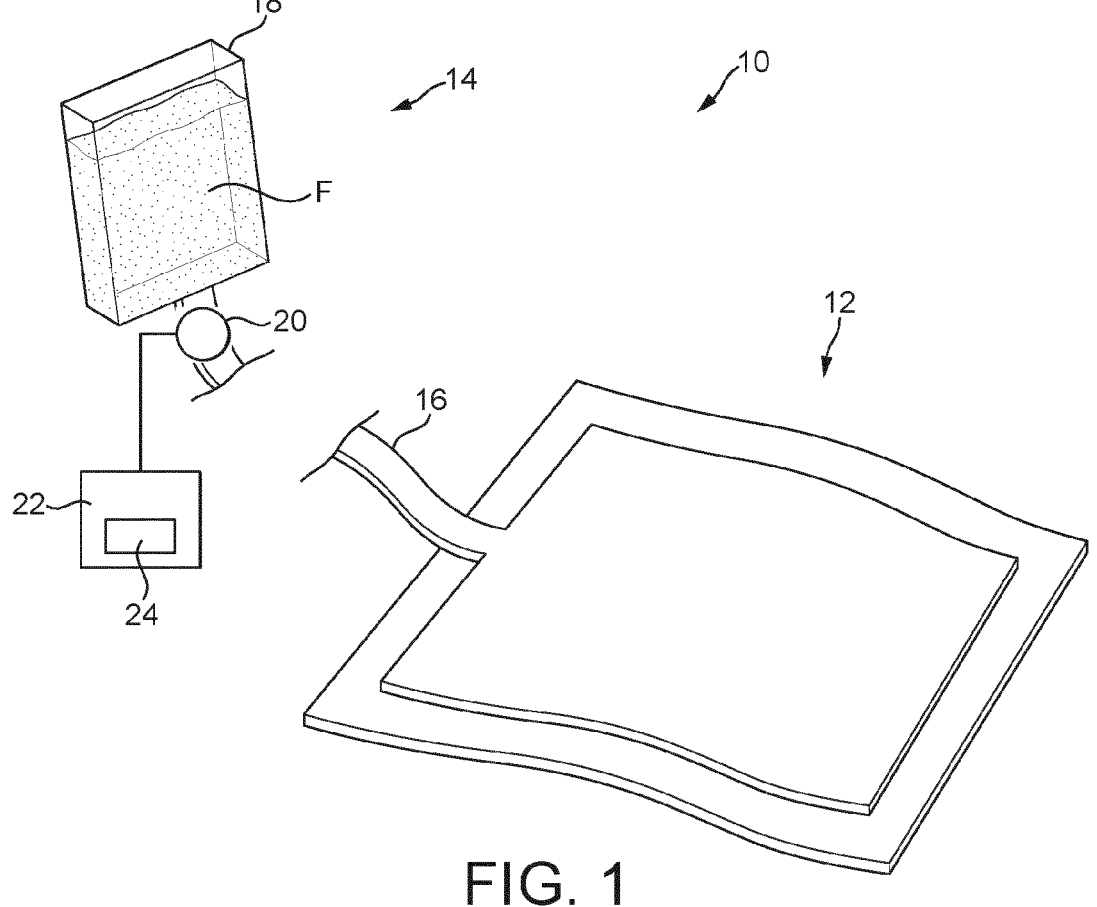
FIGS. 1-3 schematically show a fluid simulation apparatus according to an embodiment of the disclosure at three sequential stages of fluid simulation.

FIG. 1 schematically shows a fluid simulation apparatus 10 prior to use in simulation a discharge of bodily fluid. The fluid simulation apparatus 10 comprises a simulation pad 12. For example, the simulation pad 12 may be in the form of a sheet for laying in a medical training environment, such as a rectilinear sheet. The simulation pad 12 is fluidly connected to a source 14 of bodily fluid analogue via a conduit 16. Examples of bodily fluid analogues suitable for use with in the present disclosure include venous blood analogue, arterial blood analogue, and urine analogue.

In the example shown in FIG. 1, the source 14 comprises a fluid container 18, containing a bodily fluid analogue F, suspended at a position vertically higher than the simulation pad 12. A valve 20 can be provided, for example within the source 14 or in the conduit 16, which is configured to control a rate of fluid delivery from the container 18 into the conduit 16, for example by stopping and permitting flow, and permitting flow at a variable controllable flow rate In the initial configuration of the fluid simulation apparatus as shown in FIG. 1, the valve is configured to stop flow of the bodily fluid analogue, and so all of the fluid F is held within the container 18 and no fluid F is within the simulation pad 12.

A controller 22 may be operably coupled to the valve to start/stop fluid flow between the controllable fluid source 14 and the simulation pad 12, and to vary a rate of fluid flow between the controllable fluid source 14 and the simulation pad 12.

In some examples, the controller may be operable to vary a rate of fluid flow between the source of bodily fluid analogue and the simulation pad according to one or more pre-set fluid deliver profiles. At least one of the one or more pre-set routines may define or be configured to cause a plurality of different fluid flow rates of the bodily fluid analogue within a limited predetermined duration of flow delivery.

For example, in the context of a bleeding simulation, there may be an initial period of relatively low flow, followed by a sudden increase in flow associated with heavy bleeding as may be caused by e.g. trauma or uterine atony. The controller may be provided with a user interface 24 through which a user may set the rate of fluid flow, select a pre-set flow delivery profile, or modify a routine currently in progress (e.g. to simulate a sudden trauma during a medical training exercise).

In other examples, the valve may be manually operable to control the rate of fluid delivery. For example, in the context of a birth simulation a user (e.g. an instructor) may set the valve to deliver a relatively heavy flow for an initial period to simulate a post-partum haemorrhage. The user may manually operate the valve to reduce the rate of fluid flow in response to mitigation actions taken by a trainee during the birth simulation, e.g. palpitating an abdomen of a manikin/ simulated patient or using a 'Bakri balloon'.

Figure 2:
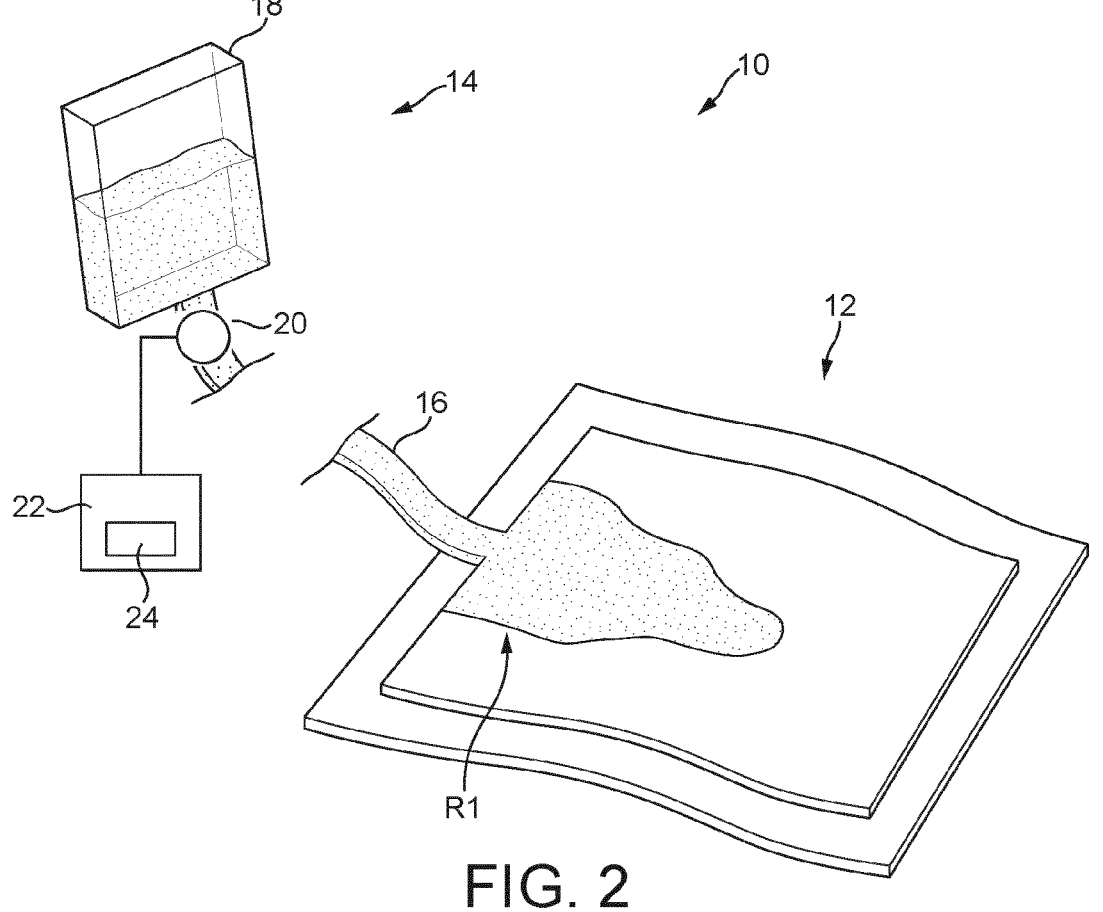

FIG. 2 schematically shows the fluid simulation apparatus 10 of FIG. 1 in a second configuration corresponding to a simulation of bodily fluid discharge in progress. Like reference numerals have been retained to indicate the same parts.

In the second configuration, the valve has opened to permit fluid to flow from the container 18 through the conduit 16 such that a first amount of the fluid F has passed into a first region R1 of the internal reservoir of the simulation pad 12. The first region R1 is proximate a point at which the conduit 16 connects to the internal reservoir.

Figure 3:
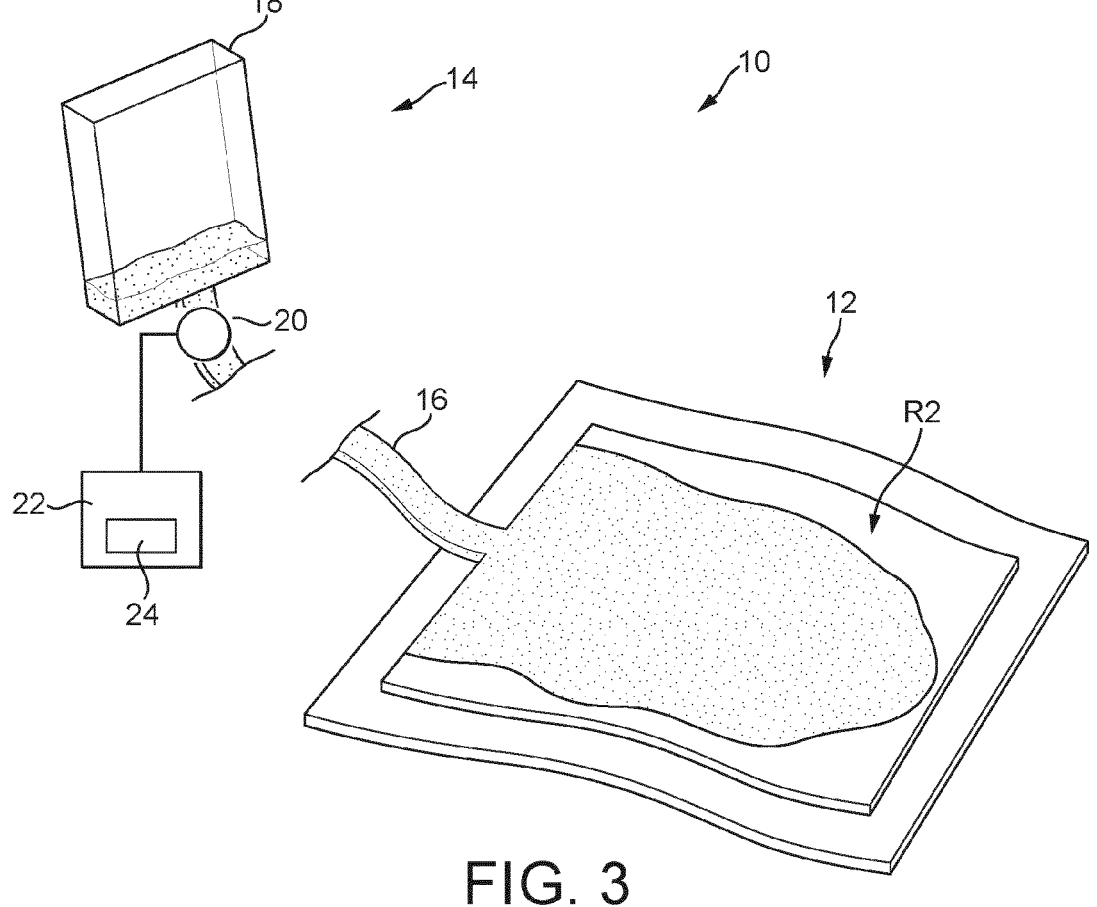

FIG. 3 schematically shows the fluid simulation apparatus 10 of FIG. 1 in a third configuration corresponding to continued discharge of the bodily fluid analogue of fluid simulation. Like reference numerals have been retained to indicate the same parts.

In the third configuration, the valve has been maintained in the same position as in FIG. 2 and a greater amount of the fluid F has passed from the container 18, through the conduit 16 and into the simulation pad such that the bodily fluid analogue extends through a larger second region R2 of the internal reservoir of the simulation pad 12. The second region R2 extends a greater distance than the first region R1 from the point at which the conduit 16 connects to the internal reservoir.

In use, the apparatus is oriented or arranged such that the point at which the conduit 16 connects to the internal reservoir is proximate the manikin or simulated patient. In some examples, the apparatus may be oriented or arranged such that the point at which the conduit 16 connects to the internal reservoir is proximate or adjacent an orifice or wound of the manikin or simulated patient.

Figure 4:
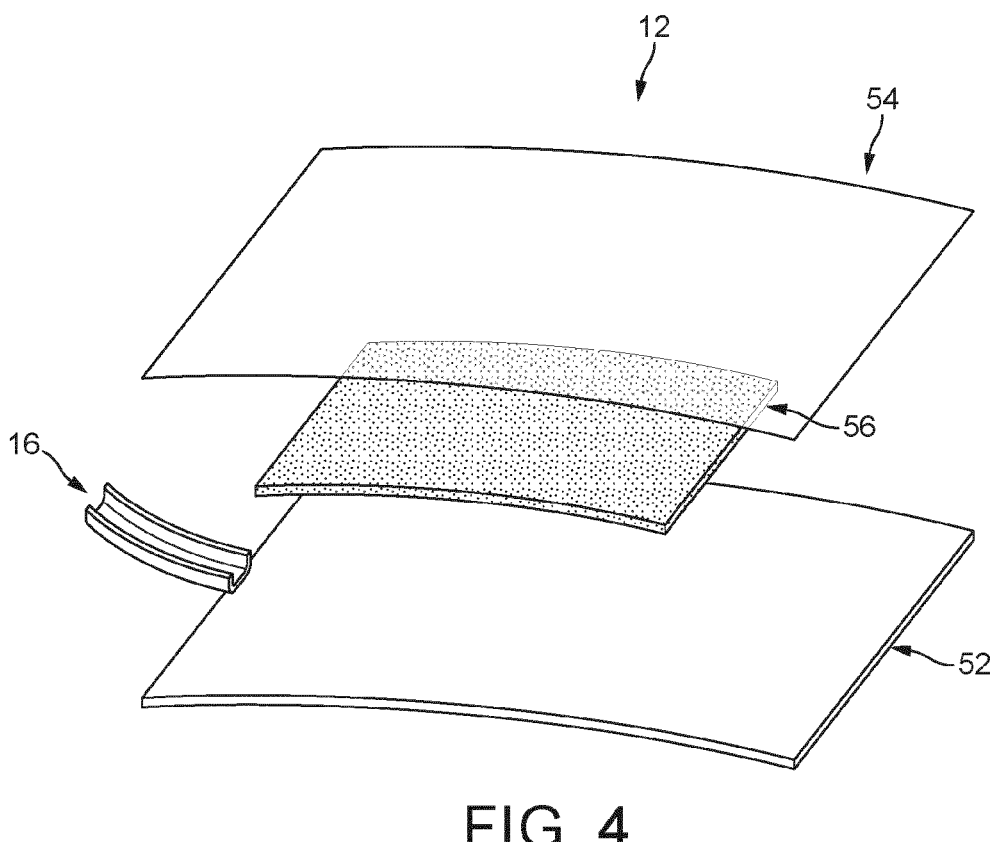
FIG. 4 schematically shows an exploded view of the simulation pad of the simulation apparatus of FIGS. 1-3.

FIG. 4 schematically shows an exploded view of the simulation pad of the simulation apparatus of FIGS. 1-3. Like reference numerals have been retained to indicate the same parts.

The simulation pad 12 comprises a waterproof base 52. The simulation pad 12 further comprises a transparent cover 54, the whole or part of which may be transparent so that the interior of the fluid reservoir is visible through it. The transparent cover 54 is joined to the waterproof base 52 at a periphery of the transparent cover 54. The transparent cover 54 may be permanently joined to the waterproof base 52 along some or all of its edges (e.g. by stitching, seaming, gluing, etc.) or may be removably joined to the waterproof base 52 (e.g. using hook and loop fasteners, zips, etc.) along some or all of its edges, provided that a watertight seal is formed between the two components. For example, the waterproof base 52 and transparent cover 54 may be provided by a bag joined at three edges with a sealable fourth edge. The sealable edge may be sealable by heat sealing, for example by a combined vacuum and heat sealing apparatus, or may be provided with a resealable fixing (such as hook and loop fasteners, zips, or a Ziploc® seal). In some examples, the transparent cover 54 may be integrally formed with the waterproof base 52.

The transparent cover 54 and the waterproof base 52 together form the internal reservoir of the simulation pad 12, i.e. a fluid can enter a space between the transparent cover 54 and the waterproof base 52 through the conduit 16, said fluid being visible to a user through the transparent cover 54.

In the embodiment shown in FIG. 4, the simulation pad 12 further comprises a fluid-absorbing pad 56 formed of a fluid absorbent material. For example, the fluid-absorbing pad 56 could be an off-the-shelf incontinence pad. The fluid-absorbing pad 56 is configured to absorb fluid that is released into the internal reservoir of the simulation pad 12 in use. Said fluid is consequently dispersed slowly from the point at which the conduit joins the simulation pad 12 through the internal reservoir (i.e. compared to simulation pads that do not include a fluid-absorbing pad) in a way that may visually mimic the spread of discharged bodily fluid in a medical training environment.

Further, the fluid-absorbing pad 56 prevents fluid from flowing freely within the internal reservoir, for example collecting in pools and moving around as the simulation pad is re-positioned. The free flow of fluid within the internal reservoir detracts from the accuracy of fluid simulation, as fluid does not flow in this way when discharged into a medical training environment or onto an incontinence pad, as is typically provided in surgery or other medical procedures (such as childbirth). In examples where a fluid-absorbing pad 56 is not present, the viscosity of the bodily fluid analogue can be selected such that the spread of fluid within the internal reservoir visually mimics the appearance of fluid from a patient being absorbed into an incontinence pad.

In some examples the simulation pad 12 is openable and closeable, for example by separating the transparent cover 54 from the waterproof base 52 along at least one side, or entirely removing the transparent cover 54 from the waterproof base 52. In such examples, the provision of a fluid-absorbing pad 56 improves the ease with which the simulation pad 12 can be cleaned prior to re-use, as the fluid absorbing pad 56 tends to absorb the fluid within the internal reservoir and can be easily removed from the internal reservoir and emptied of fluid (e.g. by wringing it out over a sink or drain to expel the absorbed fluid). Once all the absorbed fluid has been expelled, the fluid-absorbing pad 56 can be reinserted into the internal reservoir of the simulation pad 12 for re-use. Alternatively, the fluid-absorbing pad 56 can simply be discarded and replaced with a fresh fluid-absorbing pad.

FIG. 5_a_ schematically shows a detailed view of the point at which the conduit 16 of the fluid simulation apparatus 10 of FIGS. 1-4 connects to the internal reservoir of the fluid simulation pad 12.

An end of the conduit 16 comprises a first half 58 of a releasable connector. The simulation pad 12 comprises a short length of tubing 60 extending from the internal reservoir, between the waterproof base and transparent cover, to an exterior of the simulation pad 12. The tubing 60 has a first end in fluid communication with the internal reservoir, and a second, opposing end in fluid communication with the exterior of the simulation pad. A portion of the tubing 60 between the first and second ends is sealed in a fluid-tight relationship between the waterproof base and the transparent cover.

The second end of the tubing 60 comprises a second half 62 of a releasable connector. The second half 62 is correspondingly shaped with respect to the first half 58, such that when the first half 58 is engaged with the second half 62, a fluid flow path is formed between the conduit 16 and the tubing 60. Therefore, when the first half 58 of the releasable connector is engaged with the second half 60, fluid may flow from the conduit 16, to the second end of the tubing 60, through the tubing 60, and into the internal reservoir of the simulation pad 12.

The first half 58 and second half 62 of the releasable connector each include respective internal valves configured to permit fluid flow when the first half 58 is engaged with the second half 62, and to inhibit fluid flow when the first half 58 is not engaged with the second half 62. This arrangement ensures that no fluid flows out of the internal reservoir through the tubing 60 when the first half 58 of the releasable connector is disengaged from the second half 62. This, in turn, enables the simulation pad 12 to be quickly weighed after use.

A weight measurement can be used to determine a volume of fluid within the simulation pad 12. The proficiency of a trainee practising a surgery can be assessed based on the volume of fluid within the pad (said fluid corresponding to the volume of fluid notionally lost by a patient).

Figure 5A:
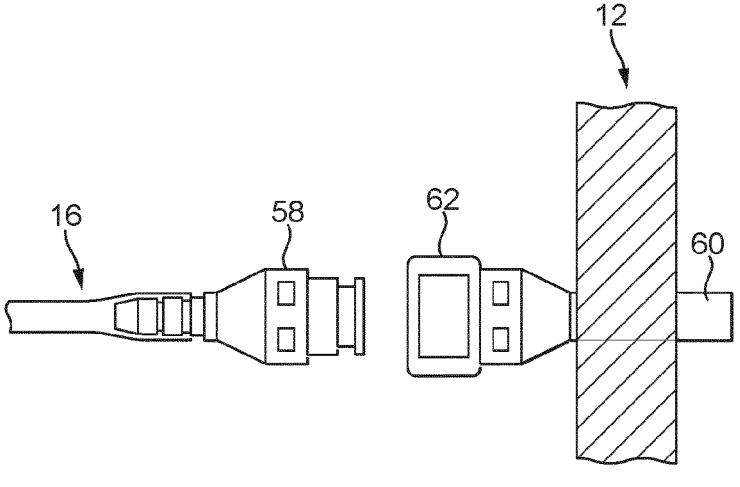
FIGS. 5a and 5b schematically show a detailed view of the point at which the conduit of the fluid simulation apparatus of FIGS. 1-4 connects to the internal reservoir of the fluid simulation pad.
Figure 5B:
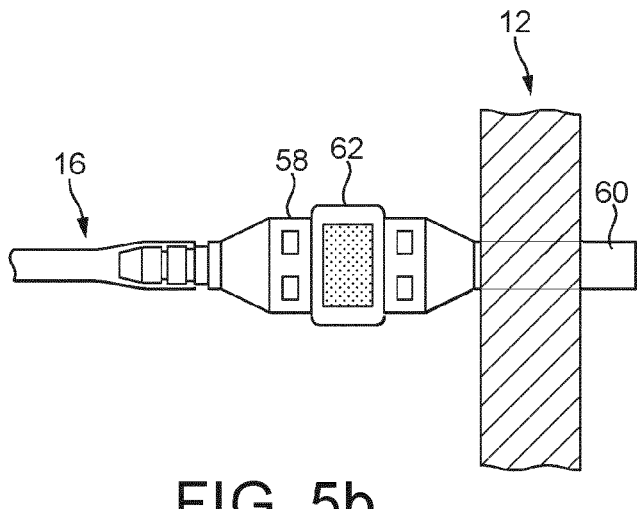

FIG. 5b schematically shows a detailed view corresponding to the view of FIG. 5a when the first half 58 of the releasable connector has been engaged with the second half 62 of the releasable connector.

Figure 6:
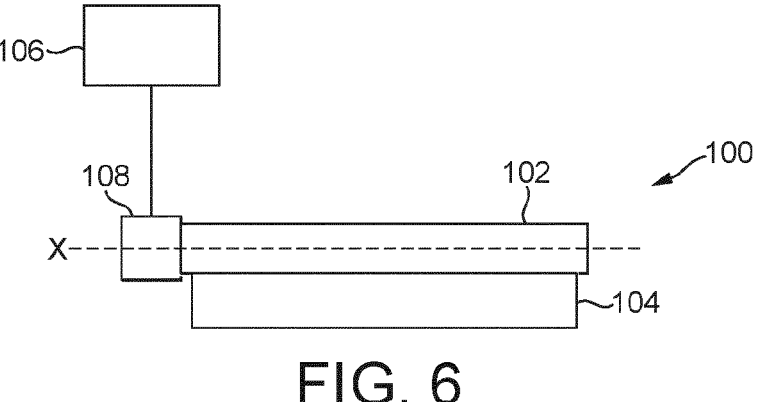
FIG. 6 schematically shows a plan view of a further fluid simulation apparatus at a first stage of fluid simulation.

A further fluid simulation apparatus 100 is shown in FIG. 6 in an initial configuration prior to commencement of fluid discharge simulation. The fluid simulation apparatus 100 comprises a dispenser 102. The dispenser 102 contains a roll of sheet material (one end of which is shown at 104) arranged to rotate about an axis X to feed out the sheet material. The sheet material is configured to have the appearance of a discharge of bodily fluid on a surface. For example, the sheet material may be printed with a graphic having the appearance of a discharge of bodily fluid in a discharge pattern that mimics the appearance of a bodily fluid discharged onto a substrate. A controller 106 is connected to a motor unit 108 which is configured to rotate the roll of fluid-simulating material about the X-axis.

Figure 7:
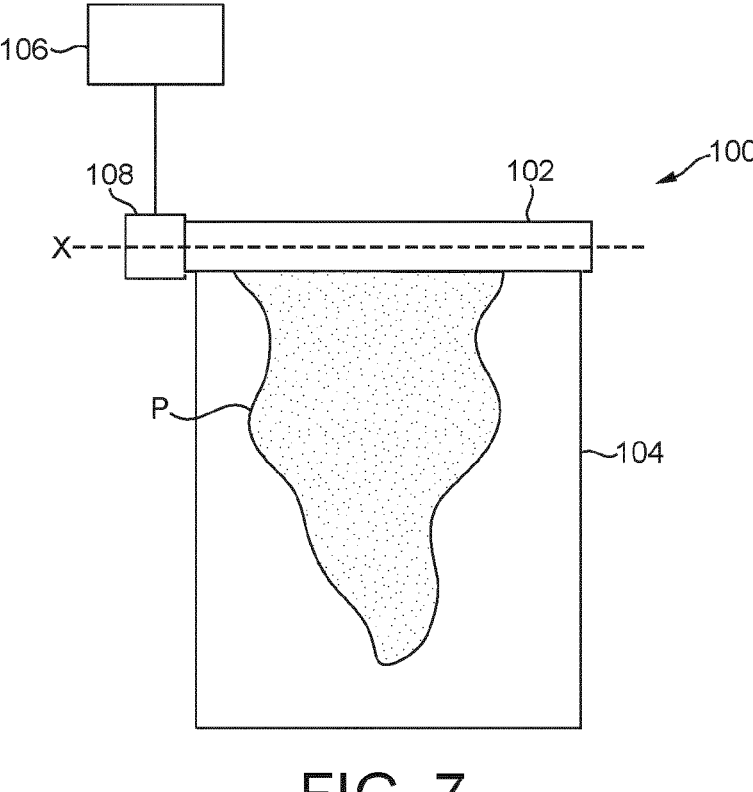
FIG. 7 schematically shows a plan view of the fluid simulation apparatus of FIG. 6 at a second stage of fluid simulation.

FIG. 7 shows the fluid simulation apparatus 100 of FIG. 6 in a second configuration corresponding to a fluid discharge simulation in progress. Like reference numerals have been retained to indicate the same parts.

The controller 106 operates the motor unit 108 to rotate the roll of sheet material about to feed out an area of sheet material. The area of fed out material comprises a fluid simulation pattern P that mimics the visual appearance of a bodily fluid when absorbed into an incontinence pad during surgery. The pattern P may be formed on the material, for example using paints or inks. Alternatively, the sheet material may comprise a base substrate and a further material provided on the substrate to provide the pattern P. For example the further material may be a translucent layer (optionally colored to simulate blood or another material), a foam, fluid or gel captive between layers of the sheet material. The further material may provide a visual color contrast with the material of the substrate.

The controller 106 may be programmed with various pre-set sheet feeding profiles corresponding to simulated surgical procedures. Each sheet feeding profile may define an associated area of fluid-simulating sheet material to be fed out and/or an associated rate at which the fluid-simulating sheet material is to be fed out. Each sheet-feeding profile may comprise programmed instructions which cause the controller 106 to operate the motor unit 108 at predetermined times following receipt of a start command. Alternatively or additionally, the scenarios may be selectively modifiable by a user in real-time (e.g. by an instructor, in order to simulate a sudden trauma during a simulated surgery). A user interface may be provided on the controller 106 to facilitate the selection and/or modification of scenarios by a user, and the input of the start command.

In some examples, a support frame may be provided comprising a support surface to support the manikin/simulated patient with which the fluid simulation apparatus 100 is to be used. The support frame may create a gap beneath the support surface, such that the fluid-simulating sheet material passes through the gap when being fed out.

This arrangement has the advantage that the fluid simulating apparatus 100 can be visually concealed beneath the support surface. This arrangement has the further advantage that the fluid-simulating sheet material does not get trapped between the manikin/simulated patient and the surface below the manikin/simulated patient when being fed out.

Figure 8:
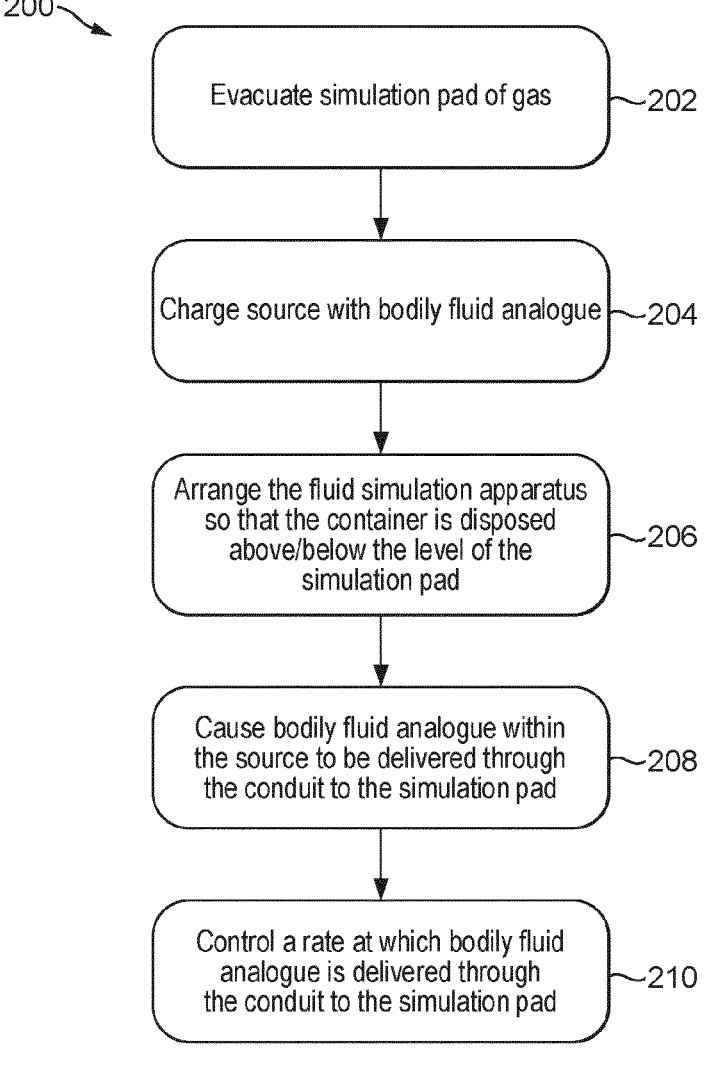
FIG. 8 schematically shows a block diagram illustrating steps of a method of simulating a discharge of a bodily fluid.

FIG. 8 schematically shows a block diagram illustrating steps of a method 200 of simulating a discharge of a bodily fluid. The method is suitable to be carried out with respect to the fluid simulation apparatus 10 described with respect to FIGS. 1-4 above, and will be described with reference to components of that apparatus using the same reference numerals. Steps 202-206 are considered optional as will become apparent from the following description.

Step 202 of the method 200 comprises evacuating the simulation pad 12 of gas. This may include vacuum sealing the simulation pad 12.

Step 204 of the method 200 comprises charging the source 14 with a bodily fluid analogue. In some examples, however, the source 14 may be provided pre-charged with a bodily fluid analogue.

In some examples, the container of the source 14 may require arranging at a suitable position either above or below the simulation pad. Step 206 of the method comprises arranging the fluid simulation apparatus 10 so that the container is disposed above or below the level of the simulation pad 12. When the container is disposed above the simulation pad 12, gravity may be relied upon to provide the motive force by which the bodily fluid analogue is delivered to the simulation pad. When the container is disposed below the simulation pad 12, a pump may be provided to pump the bodily fluid analogue to the simulation pad.

Step 208 of the method 200 comprises causing bodily fluid analogue within the source to be delivered through the conduit 16 to the simulation pad 12. This can be carried out through the opening of a valve between the source 14 and the simulation pad 12, or through the activation of a pump, for example.

Step 210 of the method 200 comprises controlling a rate at which bodily fluid analogue is delivered through the conduit 16 to the simulation pad 12. This can be done through the controlling of a valve between the source 14 and the simulation pad 12 (for example manually or by a controller executing a pre-set fluid delivery profile), or through the controlling of a pump.

Figure 9:
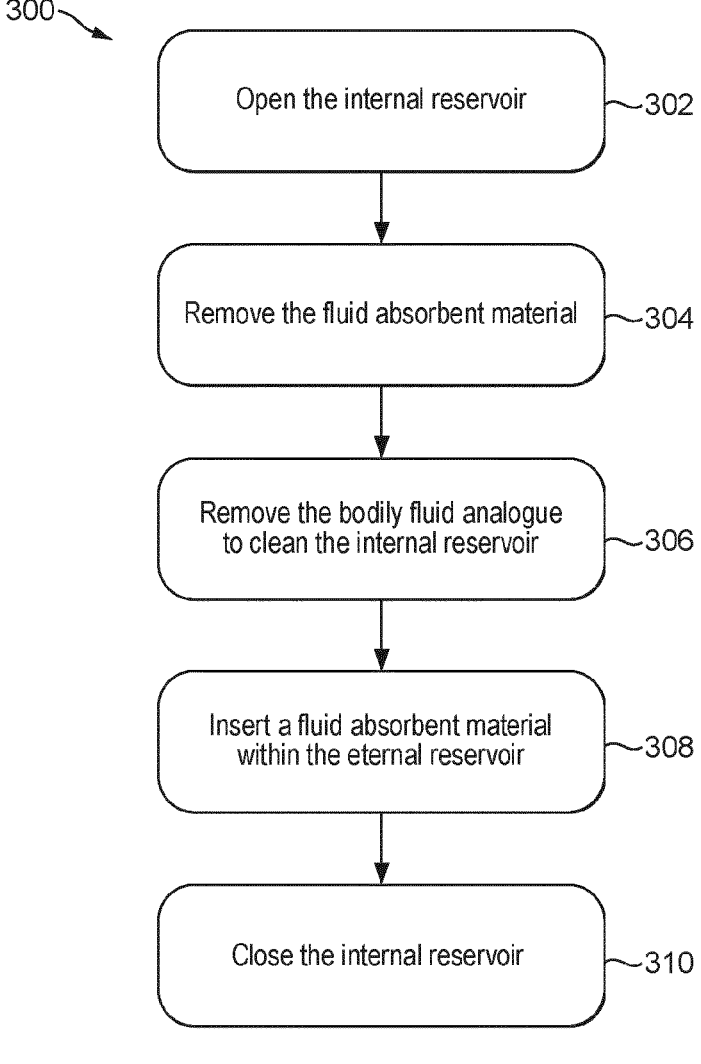
FIG. 9 schematically shows a block diagram illustrating steps of a method of preparing a fluid simulation apparatus for re-use.

FIG. 9 schematically shows a block diagram illustrating steps of a method 300 of preparing a fluid simulation apparatus for re-use following the performance of a method of simulating a discharge of a bodily fluid. The method is suitable to be carried out with respect to the fluid simulation apparatus 10 described with respect to FIGS. 1-4 above, and will be described with reference to components of that apparatus using the same reference numerals. The method is suitable for execution following performance of the method 200 of simulating a discharge of a bodily fluid described above with respect to FIG. 7. In such cases, it may be considered a continuation of the method 200. Additionally or alternatively, the method 300 may be considered to be a separate, discrete method.

Step 302 of the method 300 comprises opening the internal reservoir of the simulation pad 12. For example, a re-sealable edge of the simulation pad 12 may be opened, or a permanently sealed edge may be cut open for subsequently re-sealing (for example by heat sealing at another position).

After step 302, step 304 of the method 300 comprises removing the fluid absorbent material, e.g. the fluid absorbent pad 56.

After step 304, step 306 of the method 300 comprises removing the bodily fluid analogue to clean the internal reservoir of the simulation pad 12. This step may comprise draining the bodily fluid analogue from the internal reservoir, pumping the bodily fluid analogue from the internal reservoir, and/or washing the bodily fluid analogue from the internal reservoir (e.g. using a hose). Further, in this step the fluid absorbent material may be wrung out or otherwise manipulated to expel absorbed bodily fluid analogue therefrom.

After step 306, step 308 of the method 300 comprises inserting a fluid absorbent material within the internal reservoir of the simulation pad 12. This step could comprise re-inserting the fluid absorbent material that was previously removed from the internal reservoir (e.g. after the bodily fluid analogue has been expelled from the fluid absorbent material), or this step could comprise inserting a fresh piece of fluid absorbent material within the internal reservoir of the simulation pad 12.

After step 308, step 310 of the method 300 comprises closing the internal reservoir. This step may comprise, for example, closing the internal reservoir by vacuum sealing.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, while the fluid absorbent material is provided as a single pad in the embodiment of FIG. 4, the fluid absorbent material may alternatively be provided as multiple pads, or in other forms (e.g. fluid absorbent strips, cells, balls, etc.).

As a further example, while the source is shown as being a separate component of the apparatus in FIGS. 1-3, in other examples the controllable fluid source could be integrally formed with the simulation pad.

As a yet further example, while the source has been shown as a fluid container suspended above the simulation pad in the apparatus of FIGS. 1-3, in other examples the fluid container could be located below the simulation pad. In such examples, the fluid could be pumped from the fluid container to the simulation pad using a pump (e.g. a hand pump or an electric pump). In such examples, the rate of fluid flow from the fluid container to the simulation pad could be varied by varying the pump rate.

The source in the fluid simulation apparatus 10 shown in FIGS. 1-3 comprises only a single fluid container. However, in some examples, multiple fluid containers may be provided, each containing a different bodily fluid analogue. Each fluid container may be connected to a common manifold in fluid communication with the conduit 16, with a respective valve disposed between each fluid container and the manifold. The controller 22 may be operably coupled to each valve to start/stop fluid flow between the respective fluid container and the conduit 16, and to vary a rate of fluid flow between the respective fluid container and the conduit 16, to sequentially supply different bodily fluid analogues to the simulation pad 12.

For example, a first fluid container may contain amniotic fluid analogue, a second container may contain a urine fluid analogue, a third container may contain a feces fluid analogue, a fourth container may contain an arterial blood analogue, a fifth container may contain a birthing meconium analogue, and a sixth container may contain a venous blood analogue. To simulate birth, the controller 22 may initially operate a first valve associated with the first fluid container to flow amniotic fluid analogue to the simulation pad 12 to simulate a patient's water breaking. Subsequently, the controller 22 may operate the first valve to stop the flow of amniotic fluid to the simulation pad 12 and operate a second valve associated with the second fluid container and a third valve associated with the third fluid container to flow urine fluid analogue and feces fluid analogue to the simulation pad 12 to simulate urinary and fecal discharge commonly encountered during childbirth. Subsequently, the controller 22 may operate the second and third valves to stop the flow of urine fluid analogue and fecal fluid analogue to the simulation pad 12, and operate a fourth valve associated with the fourth fluid container to flow arterial blood analogue to the simulation pad 12 to simulate normal blood loss commonly encountered during childbirth. Subsequently, the controller 22 may operate the fourth valve to stop the flow of arterial blood analogue to the simulation pad 12, and operate a fifth valve associated with the fifth fluid container to flow birthing meconium analogue from the fifth fluid container to the simulation pad 12 to simulate birthing meconium normally encountered when a child transits the birth canal. Subsequently, the controller may operate the fifth valve to stop the flow of birthing meconium analogue to the simulation pad and operate a sixth valve associated with the sixth fluid container to flow venous blood analogue to the simulation pad 12 to simulate a post-partum haemorrhage. In other examples, some or all of the valves may be instead operated manually.

While the dispenser shown in FIGS. 6 and 7 fully encloses the roll of fluid-simulating sheet material, in other examples the dispenser may only partially enclose, or not may not enclose, the roll of fluid-simulating sheet material. In some examples, the dispenser may merely support each end of the roll of fluid-simulating sheet material.

While the fluid simulation apparatus 100 has been described with respect to a roll of fluid-simulating sheet material being rotated to be fed out, other dispensing mechanisms are envisaged that could be operated by the motor unit 108. For example, a winch could be operated by the motor unit 108, with a cable of the winch being attached to a distal end of the fluid-simulating sheet material, such that, as the cable is wound onto the winch, the distal end of the fluid-simulating sheet material is progressively pulled away from the dispenser 102 to feed out the fluid-simulating sheet material. In this arrangement, the fluid-simulating sheet material need not be provided as a roll. Instead, the fluid-simulating sheet material could be folded or pleated (e.g. in a concertina arrangement) into an initial retracted configuration. The fluid-simulating sheet material may be fed out from the retracted configuration by pulling on one end of the fluid-simulating sheet material to progressively unfold it.

The present disclosure is suitable for use in any medical training environment. Examples of such environments include operating tables and hospital beds. Further examples include battlefields and ambulances.

In the preceding, various bodily fluid analogues are described as 'fluids'. This term is intended to cover both liquids and liquids with entrained solid particles. For example, in some cases such as venous blood analogue the fluid may be interspersed with solid or semi-solid portions to simulate blood clots.

The invention claimed is:

1. A fluid simulation apparatus comprising:

a simulation pad having an internal reservoir, the simulation pad comprising at least one transparent outer surface through which a portion of the internal reservoir is visible;

a source configured to contain a bodily fluid analogue; and a conduit fluidly connecting the source to the internal reservoir of the simulation pad;

wherein the fluid simulation apparatus is controllable to cause bodily fluid analogue within the source to be delivered through the conduit to the internal reservoir of the simulation pad so that the bodily fluid analogue is visible to a user through the transparent outer surface in order to simulate a discharge of a bodily fluid onto an incontinence pad.

2. A fluid simulation apparatus according to claim 1, comprising a valve configured to control a rate of fluid flow between the source and the simulation pad.

3. A fluid simulation apparatus according to claim 1, wherein the source of bodily fluid analogue comprises a container configured to contain the bodily fluid analogue above the level of the simulation pad, and a valve, wherein the valve is configured to control a rate of fluid flow between the source and the simulation pad.

4. A fluid simulation apparatus according to claim 1, wherein the source of simulated bodily fluid comprises a container configured to contain the bodily fluid analogue, and a pump, wherein the pump is operable control a variable rate of fluid flow between the source and the simulation pad.

5. A fluid simulation apparatus according to claim 4, wherein the container is configured to contain the bodily fluid analogue below the simulation pad.

6. A fluid simulation apparatus according to claim 2, further comprising a controller operably coupled to valve and/or pump and configured to vary a rate of fluid flow between the source and the simulation pad.

7. A fluid simulation apparatus according to claim 6, wherein the controller is operable to vary a rate of fluid flow between the source of bodily fluid analogue and the simulation pad according to one or more pre-set fluid delivery profiles.

8. A fluid simulation apparatus according to claim 1, wherein the simulation pad comprises a waterproof base and a cover sealed to the base at a periphery of the cover wherein the internal reservoir is formed between the cover and the base, and wherein the cover comprises the transparent outer surface.

9. A fluid simulation apparatus according to claim 1, wherein a fluid absorbent material is disposed in the internal reservoir of the simulation pad.

10. A fluid simulation apparatus according to claim 9, wherein the fluid absorbent material is removable from the internal reservoir.

11. A fluid simulation apparatus according to claim 9, wherein the internal reservoir is openable and closeable to permit removal of the fluid absorbent material and bodily fluid analogue received therein.

12. A fluid simulation apparatus according to claim 1, wherein the source is integral with the simulation pad.

13. A fluid simulation apparatus according to claim 1, wherein the bodily fluid analogue is one of: venous blood analogue, arterial blood analogue, urine analogue, feces analogue, amniotic fluid analogue, and birthing meconium analogue.

14. A fluid simulation apparatus according to claim 1, wherein the source is charged with the bodily fluid analogue for delivery to the simulation pad.

15. A fluid simulation system comprising a fluid simulation apparatus according to claim 1 further including a manikin, wherein the manikin is disposed on or adjacent the simulation pad, and wherein the source is provided within the manikin.

16. A method of simulating a discharge of bodily fluid using a fluid simulation apparatus in accordance with claim 1, the method comprising:

controlling a rate at which bodily fluid analogue is delivered from the source to the simulation pad.

17. A method according to claim 16, further comprising:

prior to bodily fluid being delivered to the simulation pad, evacuating the simulation pad of gas.

\* \* \* \* \*